United States Patent [19]

Epperly et al.

[11] Patent Number: 5,057,293

[45] Date of Patent: Oct. 15, 1991

[54] MULTI-STAGE PROCESS FOR REDUCING THE CONCENTRATION OF POLLUTANTS IN AN EFFLUENT

[75] Inventors: William R. Epperly, New Canaan, Conn.; Jeremy D. Peter-Hoblyn, Cornwall, United Kingdom; George F. Shulof, Jr., Wilton, Conn.; James C. Sullivan, Norwalk, Conn.; Barry N. Sprague, Bethlehem, Conn.; John H. O'Leary, Danbury, Conn.

[73] Assignee: Fuel Tech, Inc., Rowayton, Conn.

[21] Appl. No.: 416,317

[22] Filed: May 23, 1989

Related U.S. Application Data

[63] Continuation-in-part of Ser. No. 22,716, Mar. 6, 1987, Pat. No. 4,777,024, and a continuation-in-part of Ser. No. 14,431, Feb. 13, 1987, Pat. No. 4,770,863, and a continuation-in-part of Ser. No. 22,799, Mar. 6, 1987, abandoned, and a continuation-in-part of Ser. No. 25,350, Mar. 13, 1987, Pat. No. 4,877,591, and a continuation-in-part of Ser. No. 25,493, Mar. 13, 1987, abandoned, and a continuation-in-part of Ser. No. 39,013, Apr. 15, 1987, Pat. No. 4,803,059, and a continuation-in-part of Ser. No. 50,198, May 14, 1987, Pat. No. 4,780,289, and a continuation-in-part of Ser. No. 100,128, Sep. 23, 1987, Pat. No. 4,863,705, and a continuation-in-part of Ser. No. 108,779, Oct. 14, 1987, Pat. No. 4,844,878, and a continuation-in-part of Ser. No. 132,801, Dec. 14, 1987, Pat. No. 4,830,839, and a continuation-in-part of Ser. No. 155,864, Feb. 2, 1988, Pat. No. 4,877,590, and a continuation-in-part of Ser. No. 207,292, Jun. 15, 1988, Pat. No. 4,863,704, and a continuation-in-part of Ser. No. 207,382, Jun. 15, 1988, Pat. No. 4,902,488.

[51] Int. Cl.$^5$ .................. C01B 21/00; C01B 17/00; C01C 3/00

[52] U.S. Cl. .................. 423/235; 423/238; 423/243

[58] Field of Search .................. 423/235, 235 D, 239, 423/239 A, 243, 238

[56] References Cited

U.S. PATENT DOCUMENTS

| | | |
|---|---|---|
| 3,801,696 | 4/1974 | Mark . |
| 3,846,981 | 11/1974 | Paczkowski . |
| 3,900,554 | 8/1975 | Lyon . |
| 4,080,423 | 3/1978 | Smith et al. . |
| 4,081,509 | 3/1978 | Hishinuma et al. . |
| 4,087,372 | 5/1978 | Saitoh et al. . |
| 4,115,515 | 9/1978 | Tenner et al. . |
| 4,208,386 | 6/1980 | Arand et al. . |
| 4,213,944 | 7/1980 | Azuhata et al. . |
| 4,314,345 | 2/1982 | Shiraishi et al. . |
| 4,325,924 | 4/1982 | Arand et al. . |
| 4,350,669 | 9/1982 | Izumi et al. . |
| 4,388,281 | 6/1983 | Holter et al. . |
| 4,400,362 | 8/1983 | Lerner . |
| 4,419,333 | 12/1983 | Reus et al. . |
| 4,473,536 | 9/1984 | Carberg et al. . |
| 4,473,537 | 9/1984 | Ford et al. . |
| 4,507,269 | 3/1985 | Dean et al. . |
| 4,521,388 | 6/1985 | Samish et al. . |
| 4,565,679 | 1/1986 | Michalak et al. . |
| 4,603,036 | 7/1986 | Botton et al. . |
| 4,624,840 | 11/1986 | Dean et al. . |
| 4,731,233 | 3/1988 | Thompson et al. . |
| 4,770,863 | 9/1988 | Epperly et al. . |
| 4,777,024 | 10/1988 | Epperly et al. ............ 423/235 |
| 4,822,577 | 4/1989 | Epperly et al. ............ 423/243 |
| 4,863,704 | 9/1989 | Epperly et al. ............ 423/235 |

FOREIGN PATENT DOCUMENTS

| | | |
|---|---|---|
| 2630202 | 2/1977 | Fed. Rep. of Germany . |
| 51-76166 | 7/1976 | Japan . |
| 51-104948 | 9/1976 | Japan . |
| 50-67669 | 12/1976 | Japan . |
| 5379762 | 12/1976 | Japan . |
| 51-1138 | 7/1977 | Japan . |
| 51-4588 | 7/1977 | Japan . |
| 51-112330 | 8/1977 | Japan . |
| 5189176 | 2/1978 | Japan . |
| 53-033975 | 3/1978 | Japan . |
| 52-42643 | 11/1978 | Japan . |
| 53-130274 | 11/1978 | Japan . |
| 54-38268 | 3/1979 | Japan . |
| 54-51986 | 4/1979 | Japan . |
| 54-72763 | 6/1979 | Japan . |
| 54-119370 | 9/1979 | Japan . |
| 54-123573 | 9/1979 | Japan . |
| 54-158371 | 12/1979 | Japan . |
| 55-44365 | 3/1980 | Japan . |
| 55-49130 | 4/1980 | Japan . |
| 57-190638 | 11/1982 | Japan . |
| 8702023 | 10/1986 | PCT Int'l Appl. . |

OTHER PUBLICATIONS

Muzio et al., "Gas Phase Decomposition of Nitric Oxide in Combustion Products", Sixteenth Symposium on Combustion, Cambridge, Mass. 1976, pp. 199–208.
Faucett et al., "Technical Assessment of $NO_x$ Removal Process for Utility Application", EPRI AF–568, EPA/600/7–77/127, Nov. 1977, pp. 187–196.

Primary Examiner—Gregory A. Heller
Attorney, Agent, or Firm—St. Onge Steward Johnston & Reens

[57] ABSTRACT

A process is presented for reducing the concentration of pollutants in an effluent from the combustion of a carbonaceous fuel. The process comprises introducing a first treatment agent into the effluent at a first temperature zone to reduce the concentration of a first pollutant and introducing a second treatment agent into the effluent at a second temperature zone to reduce the concentration of either the first pollutant or a second pollutant, wherein the first and second treatment agents are introduced under conditions effective to reduce the effluent pollution index.

70 Claims, No Drawings

MULTI-STAGE PROCESS FOR REDUCING THE CONCENTRATION OF POLLUTANTS IN AN EFFLUENT

RELATED APPLICATION

This application is a continuation-in-part of copending and commonly assigned U.S. patent application Ser. No. 022,716 entitled "Multi-Stage Process for Reducing the Concentration of Pollutants in an Effluent", filed in the names of Epperly, Peter-Hoblyn, Shulof, Jr. and Sullivan on Mar. 6, 1987, now U.S. Pat. No. 4,777,024; copending and commonly assigned U.S. patent application Ser. No. 014,431 entitled "Process for the Reduction of Nitrogen Oxides in an Effluent" filed in the names of Epperly and Sullivan on Feb. 13, 1987, now U.S. Pat. No. 4,770,863; copending and commonly assigned U.S. patent application Ser. No. 022,799 entitled "Process for Reducing Nitrogen Oxides in an Effluent Using a Hydrocarbon or Hydrogen Peroxide" filed in the name of Sullivan on Mar. 6, 1987 now abandoned; copending and commonly assigned U.S. patent application Ser. No. 025,350 entitled "Process for the Reduction of Nitrogen Oxides in an Effluent Using Sugar" filed in the names of Epperly and Sullivan on Mar. 13, 1987, now U.S. Pat. No. 4,877,591; copending and commonly assigned U.S. patent application Ser. No. 025,493 entitled "Process for the Reduction of Nitrogen Oxides in an Effluent Using a Heterocyclic Hydrocarbon" filed in the names of Epperly and Sullivan on Mar. 13, 1987 now abandoned; copending and commonly assigned U.S. patent application Ser. No. 039,013 entitled "Process for the Reduction of Nitrogen Oxides in an Effluent Using a Hydroxy Amino Hydrocarbon" filed in the names of Sullivan and Epperly on Apr. 15, 1987, now U.S. Pat. No. 4,803,059; copending and commonly assigned U.S. patent application Ser. No. 050,198 entitled "Process for Nitrogen Oxides Reduction and Minimization of the Production of Other Pollutants" filed in the names of Epperly, O'Leary and Sullivan on May 14, 1987, now U.S. Pat. No. 4,780,289; copending and commonly assigned U.S. patent application Ser. No. 100,128 entitled "Process for the Reduction of Nitrogen Oxides in an Effluent" filed in the, names of Epperly, Sullivan and Sprague on Sept. 23, 1987, now U.S. Pat. No. 4,863,705; and copending and commonly assigned U.S. patent application Ser. No. 108,779 entitled "Process for the Reduction of Nitrogen Oxides in an Effluent" filed in the names of Epperly, Sullivan and Sprague on Oct. 14, 1987, now U.S. Pat. No. 4,844,878; copending and commonly assigned U.S. patent application Ser. No. 132,801 entitled "Ammonia Scrubbing" filed in the names of Epperly, Peter-Hoblyn and Sullivan on Dec. 14, 1987, now U.S. Pat. No. 4,830,839; copending and commonly assigned U.S. patent application Ser. No. 155,864 entitled "Process for Nitrogen Oxides Reduction with Minimization of the Production of Other Pollutants" filed in the names of Epperly, O'Leary, Sullivan and Sprague on Feb. 2, 1988, now U.S. Pat. No. 4,877,590; copending and commonly assigned U.S. patent application Ser. No. 207,292 entitled "Multi-Stage Process for Reducing the Concentration of Pollutants in an Effluent Using an Ammonium Salt" filed in the names of Epperly, Peter-Hoblyn, Shulof, Jr., Sullivan and Sprague on June 15, 1988, now U.S. Pat. No. 4,863,704; and copending and commonly assigned U.S. patent application Ser. No. 207,382 entitled "Process for Nitrogen Oxides Reduction With Minimization of the Production of Other Pollutants" filed in the names of Epperly, O'Leary, Sullivan and Sprague on June 15, 1988, now U.S. Pat. No. 4,902,488, the disclosures of which are incorporated herein by reference.

TECHNICAL FIELD

The present invention relates to a process for reducing the concentration of pollutants, especially pollutants such as nitrogen oxides ($NO_x$) in the effluent from the combustion of a carbonaceous fuel. Preferably, the effluent is the oxygen-rich effluent from the combustion of a carbonaceous fuel.

Carbonaceous fuels can be made to burn more completely, and with reduced emissions of carbon monoxide and unburned hydrocarbons, when the oxygen concentrations and air/fuel ratios employed are those which permit high flame temperatures. When fossil fuels are used to fire large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. Even in circulating fluidized bed boilers that operate at temperatures of 1300° F. to 1600° F., significant amounts of nitrogen oxides can be formed. Moreover, such high temperatures, as well as hot spots of higher temperatures, tend also to cause the production of pollutants such as $SO_3$, the temperatures being so high that oxidation of sulfur dioxide ($SO_2$) occurs wherein sulfur dioxide and atomic oxygen (O) combine to form sulfur trioxide. This effect is amplified when high sulfur fuels are used. Additionally, sulfur trioxide can form at lower temperatures by the catalytic reaction of sulfur dioxide with molecular oxygen ($O_2$) brought about by catalytic metals such as vanadium oxide and iron oxides which can be in the boiler interior at lower temperatures. Sulfur trioxide, therefore, can be formed even in circulating fluidized bed boilers.

Nitrogen oxides are troublesome pollutants which are found in the combustion effluent streams of large utility and circulating fluidized bed boilers when fired as described above, and comprise a major irritant in smog. It is further believed that nitrogen oxides often undergo a process known as photo-chemical smog formation, through a series of reactions in the presence of sunlight and hydrocarbons. Moreover, nitrogen oxides are a significant contributor to acid rain.

Sulfur oxides, especially $SO_3$, are also considered to be troublesome pollutants. Sulfur trioxide can combine with ammonia ($NH_3$) in the effluent stream (such as ammonia present as a byproduct generated in a nitrogen oxides reducing process utilizing urea or the like) to form ammonium bisulfate ($NH_4HSO_4$) which can form undesirable deposits on the walls and heat transfer surfaces, particularly the air heater, of the boiler.

Unfortunately, the high temperatures within boilers render most common methods of reducing $NO_x$ and/or $SO_3$ concentrations, such as effluent scrubbing or catalyst grids, uneconomical, infeasible, or both.

BACKGROUND ART

Many different processes and compositions have been proposed for chemically reducing nitrogen oxide levels in an effluent. These proposals call for adding chemicals, dry or in solution, directly to the effluent and can achieve significant NO$_x$ reductions. However, none have been identified which add a number of different chemicals at defined, distinct temperature zones to achieve NO$_x$ reductions of greater than 50%, and preferably greater than 75%, with commercially practical residence times. Moreover, some of the techniques are capable of reducing NO$_x$ only at the expense of creating undesirable levels of other pollutants such as ammonia and/or carbon monoxide. Additionally, none of the prior processes is capable of achieving both reductions in nitrogen oxides as well as significant reductions in sulfur trioxide in a single unified process.

In U.S. Pat. No. 3,900,554, Lyon discloses reducing nitrogen monoxide (NO) in a combustion effluent by injecting ammonia, specified ammonia precursors or their aqueous solutions into the effluent for mixing with the nitrogen monoxide at a temperature within the range of 1600° F. to 2000° F. Lyon also suggests the use of reducing agents, such as hydrogen or various hydrocarbons, to permit the effective use of ammonia at effluent temperatures as low as 1300° F. Although the patent suggests staged injection of the ammonia composition, there remains no teaching of the efficacy of injecting distinct compositions at different temperature zones to optimize NO$_x$ reduction without producing a substantial amount of other pollutants.

In U.S. Pat. No. 4,208,386, Arand et al. disclose that, for oxygen-rich effluents, the temperature of the effluent should be in the range of 1300° F. to 2000° F. for reducing the nitrogen oxides. concentration using urea added dry or in aqueous solution. Alkanoic solvents are said to be reducing agents which, like hydrogen, carbon monoxide, etc., enable the effective operating temperature to be lowered to below 1600° F. Disclosed again is the suggestion to inject in increments, but these incremental injections are of the same urea composition and must all be at positions meeting the same temperature and oxygen concentration conditions. The same holds true for U.S. Pat. No. 4,325,924 to Arand et al.

Although the prior art discloses injection of a composition for reducing nitrogen oxides at a number of spaced positions in, for instance, Bowers, in copending and commonly assigned U.S. patent application Ser. No. 906,671, filed Sept. 10, 1986, now U.S. Pat. No. 4,751,065, and Bowers, in copending and commonly assigned U.S. patent application Ser. No. 784,828, filed Oct. 4, 1985, now U.S. Pat. No. 4,719,092, each disclosure is related to the injection of the same composition at locations in which the same conditions, such as temperature and oxygen concentration, exist.

Furthermore, although the reduction of the concentration of nitrogen oxides in an effluent to as great an extent as possible is highly desirable, prior art systems for reducing NO$_x$ concentrations are limited, not only by the amount of NO$_x$ reduction that can be achieved utilizing them, but also by the amount of other pollutants, such as ammonia or carbon monoxide, generated as byproducts of the NO$_x$-reducing process.

What is desired, therefore, is a process for substantially reducing the concentration of nitrogen oxides and/or sulfur trioxide in an effluent while maintaining a suitably low level of other pollutants.

DEFINITIONS

For the purposes of this description, the following definitions shall apply:

"temperature zone" refers to a locale wherein, under steady state conditions, the effluent temperature is within a certain range;

"treatment agent" refers to a composition comprising a reductant chemical, i.e., a pollution reducing chemical capable of reducing NO$_x$, sulfur oxides (SO$_x$) or other pollutants, and, preferably, a solvent:

"urea" and "ammonia" refer to the compounds urea and ammonia themselves, as well as compounds equivalent in effect. Among those compounds are ammonium carbonate, ammonium formate, ammonium oxalate, ammonium hydroxide and various stable amines, and their solutions in water;

"pollution index" refers to an index which indicates the presence of all of the pollutants in the effluent;

"oxygenated hydrocarbon" refers to substituted and unsubstituted, straight or branch-chain aliphatic and cyclic, heterocyclic and aromatic hydrocarbons having at least one oxygen either in or bonded directly to the primary hydrocarbon chain or in or bonded directly to a substituent group, and mixtures thereof, typical substituent groups of which include carboxylic acid groups (COOH), peroxide groups (—O—O—), carbonyl groups (C=O), hydroxy groups (OH), ether gtoups (—O—), ester groups (COOR), etc.; "hydroxy amino hydrocarbon" refers to any cyclic, heterocyclic, aromatic, straight or branched chain, substituted or unsubstituted hydrocarbon having at least one substituent comprising a hydroxy or a carboxy group and at least one primary, secondary or tertiary amino group; "ammonium salt of an organic acid having a carbon to nitrogen ratio of greater than 1:1" refers to salts which can be formed by the neutralization of ammonium hydroxide with an organic acid, preferably a carboxylic acid (i.e., an acid having one or more carboxyl (COOH) groups). If the acid has more than one carboxylate group, they may be partially or completely neutralized by ammonium hydroxide. The ratio of carbon to nitrogen in the salt is greater than 1:1, meaning that there is more than one carbon per each nitrogen in the compound, most preferably there are at least two carbons per each nitrogen in the compound; "five or six-membered heterocyclic hydrocarbon having at least one cyclic nitrogen" refers to a cyclic five or six member hydrocarbon in which one or more of the atoms in the ring is nitrogen. The cyclic compounds can be either saturated or unsaturated; "heterocyclic hydrocarbon having at least one cyclic oxygen" refers to a ringed hydrocarbon compound having at least one ring oxygen; "alcohol" refers to a hydrocarbon derivative in which one or more hydrogen atoms have been replaced by a hydroxy group; "sugar" refers to a number of useful saccharide materials which are capable of decreasing the NO$_x$ concentration in an effluent under conditions as described herein, including non-reducing and reducing water soluble mono-saccharides and the reducing and non-reducing polysaccharides and their degradation products, such as pentoses including aldopentoses, methyl pentoses, keptopentoses like xylose and arabinose, deoxyaldoses like rhaminose, hexoses and reducing saccharides such as aldo hexoses like glucose, galactose and mannose, ketohexoses like fructose and sorbose, disaccharides like lactose and maltose, non-reducing disaccharides like sucrose and other polysaccharides such as dextrin and raffinose, hydrolyzed starches which contain as their constituents oligosaccharides, and water dispersible polysaccharides; "furfural" refers to furfural itself as well as substituted furfural. Typical substituents include side chains comprising straight and branched-chain, substituted and unsubstituted aliphatic groups, oxygenated hydrocarbon groups and amino groups; "amino acid" refers to any organic compound containing an amine group and a carboxylic acid group; "$NH_4$-lignosulfonate" and "calcium lignosulfonate" refer respectively to the ammonium and calcium salts of lignosulfonic acid, which are sulfonate salts made from the lignin of sulfite pulp-mill liquors; "1,3 dioxolane" refers to a five-membered heterocyclic hydrocarbon having oxygen at the 1 and 3 positions (also ethylene methylene dioxide); "fish oil" refers to a drying oil obtained chiefly from menhaden, pilchard, sardine and herring, extracted from the entire body of the fish by cooking and compressing; "solution" refers to any solution, mixture or dispersion, with "solvent" referring to solvent, carrier or dispersant.

DISCLOSURE OF INVENTION

This invention relates to a process for reducing the concentration of at least one pollutant in the effluent from the combustion of a carbonaceous fuel. One of the objectives of the invention is to achieve the desired level of pollutant control, such as a significant reduction in nitrogen oxides or sulfur trioxide concentration, while minimizing other harmful emissions such as ammonia and carbon monoxide, and maximizing the utilization of the chemicals employed.

More particularly, the present invention comprises a process which serially treats the effluent from the combustion of a carbonaceous fuel by introducing different treatment agents at different effluent temperatures. For example, a first treatment agent is introduced into the effluent at a first temperature zone to reduce the effluent concentration of a first pollutant, a second treatment agent is introduced into the effluent at a second temperature zone to reduce the effluent concentration of either the first pollutant or a second pollutant, and the process is repeated, if desired, to achieve the desired level of pollutant control. The composition of each treatment agent is formulated to be effective at reducing the concentration of the target pollutant, especially nitrogen oxides or sulfur trioxide, in the effluent when introduced into the effluent at the designated temperature zone.

It has been found that nitrogen oxide and/or sulfur trioxide reduction can be improved by increasing the amount of reductant chemical employed in the treatment agent. However, a point is reached where emissions of other pollutants such as ammonia are experienced. The emission of such other pollutants is undesirable. For instance, the emission of ammonia can lead to harmful deposits of ammonium bisulfate, especially when there is sulfur trioxide in the effluent. Furthermore, carbon monoxide, another undesirable pollutant, can also be produced. This limits the amount of pollutant control possible in any one treatment step. It has also been found that different chemical formulations are effective at reducing nitrogen oxides or sulfur trioxide concentrations at different temperatures.

Moreover, it is not possible to introduce chemicals in every location in a boiler, because of design considerations. The introduction must occur in a location where space is available inside the boiler for distribution of chemicals. Introduction directly on heat exchange tubes could lead to harmful deposits and ineffective use of chemicals. As a practical matter, adequate space for introduction may typically exist in a boiler at two to four locations, and these will be at different temperatures because of the heat transfer taking place.

In the practice of this invention, nitrogen oxides reduction can be maximized by selecting the locations at which introduction is possible, formulating treatment agents that are effective at reducing the nitrogen oxides level at the temperature at each location, injecting the chemicals at each location to maximize reduction while avoiding other emissions such as ammonia and carbon monoxide, and controlling the introduction process as boiler load varies. For example, if boiler load drops from 100% to 50%, temperatures at each location may be lowered and changes in introductions (amount, composition, or both) may be needed.

This invention can be used to achieve a given level of nitrogen oxides control and also to minimize the chemical cost of doing so. To accomplish this, use of the least expensive treatment agent is preferably maximized first, followed by the next least expensive treatment agent, etc., until the desired level of control is achieved.

The present invention can also be used to reduce the amount of nitrogen oxides in the effluent while also reducing the concentration of $SO_3$ in the effluent by introducing a first, $NO_x$-reducing treatment agent into the effluent at a first effluent temperature zone and then introducing a second, $SO_3$-reducing treatment agent into the effluent at a second effluent temperature zone. Most preferably, nitrogen oxides reductions are maximized by providing a second treatment agent which is capable of reducing both sulfur trioxide and nitrogen oxides.

Although this description is written in terms of the reduction of the concentration of nitrogen oxides and/or sulfur trioxide in the effluent, the skilled artisan will recognize that the process of this invention may be equally applicable to the reduction of other pollutants which may be found in the effluent from the combustion of a carbonaceous fuel. Furthermore, although written in terms of utilization in a suspension-fired boiler, the description should be understood to be equally applicable to other types of units such as circulating fluidized bed boilers and moving grate boilers, both firing a variety of fuels including refuse. The description is also applicable to gas turbines.

The presence of pollutants in an effluent may be referred to as the pollution index. It will be understood that reducing the concentration of one pollutant, such as nitrogen oxides, in the effluent in a process which simultaneously leads to the generation of an equal or greater amount of another pollutant does not lower the pollution index. Likewise, reduction of the effluent concentrations of two different pollutants, such as nitrogen oxides and sulfur trioxide, leads to a reduction in the effluent pollution index greater than the reduction obtained when only one pollutant is reduced. The present invention accomplishes the reduction of nitrogen oxides while substantially avoiding the production of other pollutants such as ammonia or carbon monoxide,. and/or also accomplishes the reduction of sulfur trioxide, thus effecting a net lowering of the pollution index of the effluent, by a step-wise or multi-stage process wherein a plurality of treatment fluids are introduced into the effluent at a plurality of temperature zones.

The use of the terms "first", "second" and "third" treatment zones in this description is meant to denote relative locations of the treatment zones. For instance, the second temperature zone can be any zone where the effluent temperature is lower than the effluent temperature of the first temperature zone. Similarly, the third temperature zone can be any zone where the effluent temperature is lower than the effluent temperature in the second temperature zone, etc This description should not be read as indicating that any specific temperature zone for introduction must in all cases be in a location where the effluent is in a specific temperature range (i.e., the first temperature zone does not in all cases have to be in a location where the effluent temperature is in the range of about 1700° F. to about 2000° F., and as high as about 2100° F.). Moreover, the terms "first", "second", "third", etc. are meant to be relevant with respect to the present invention only and do not exclude other effluent treatments performed either "before" (in time or location) the first treatment or "after" the third or final treatment, whether for the same or different pollutants, combustion enhancement, etc.

The treatment agent to be introduced at any particular temperature zone is preferably chosen to be most effective at the effluent temperatures existing within that zone. For instance, if the first available temperature zone for introduction is in an upstream location comprising a temperature zone where the effluent temperature is in the range of about 1700° F. to about 2000° F. or even as high as 2100° F., the treatment fluid can be chosen to be that which is most effective in that temperature range, such as an aqueous solution of urea, as disclosed by Arand et al. in U.S. Pat. No. 4,208,386, and by Bowers in U.S. Pat. No. 4,719,092 entitled "Reduction of Nitrogen-Based Pollutants Through the Use of Urea Solutions Containing Oxygenated Hydrocarbon Solvents", or an aqueous solution of ammonia, or gaseous ammonia itself, as disclosed by Lyon in U.S. Pat. No. 3,900,554, the disclosures of which are incorporated herein by reference. Although the mechanism by which ammonia or urea decrease the concentration of nitrogen oxides is not fully understood, it is believed that they function by facilitating a series of reactions involving $NH_x$ radicals (x being an integer) and $NO_x$. The molar ratio of the concentration of $NH_x$ radicals to the concentration of $NO_x$ ($[NH_x]/[NO_x]$) is often referred to as the normalized stoichiometric ratio (NSR).

If the geometry of the boiler permits, two introductions can be made in an upstream location. The first can be further upstream in a temperature zone where the effluent temperature is about 1850° F. to about 2000° F. and the second at a location downstream from the first location in a temperature zone where the effluent temperature is about 1700° F. to about 1850° F. As indicated by the referenced disclosures, the urea or ammonia solution can be more concentrated (e.g., about 10% to about 50% urea or ammonia by weight) in the lower temperature location and more dilute (e.g., preferably about 5% to about 10% urea or ammonia by weight and as low as about 2%) in the higher temperature location.

Appropriate temperature zones for introduction according to the present invention may also be found downstream from the zones discussed above, where the effluent temperature is in the range of about 1350° F. to about 1750° F. Suitable treatment agents for introduction into a temperature zone having such effluent temperatures are disclosed in those patent discussed above and also by Bowers in U.S. Pat. No. 4,751,065 entitled "Reduction of Nitrogen- and Carbon-Based Pollutants"; copending and commonly assigned U.S. patent application Ser. No. 014,431 entitled "Process for the Reduction of Nitrogen Oxides in an Effluent" filed in the names of Epperly and Sullivan on Feb. 13, 1987; copending and commonly assigned U.S. patent application Ser. No. 025,350 entitled "Process for the Reduction of Nitrogen Oxides in an Effluent Using Sugar" filed in the names of Epperly and Sullivan on Mar. 13, 1987; copending and commonly assigned U.S. patent application Ser. No. 025,493 entitled "Process for the Reduction of Nitrogen Oxides in an Effluent Using a Heterocyclic Hydrocarbon" filed in the names of Epperly and Sullivan on Mar. 13, 1987, now abandoned; copending and commonly assigned U.S. patent application Ser. No. 039,013 entitled "Process for the Reduction of Nitrogen Oxides in an Effluent Using a Hydroxy Amino Hydrocarbon" filed in the names of Sullivan and Epperly on Apr. 15, 1987, now abandoned; copending and commonly assigned U.S. patent application Ser. No. 100,128 entitled "Process for the Reduction of Nitrogen Oxides in an Effluent" filed in the names of Epperly, Sullivan and Sprague on Sept. 23, 1987, now U.S. Pat. No. 4,863,705; and copending and commonly assigned U.S. patent application Ser. No. 108,779 entitled "Process for the Reduction of Nitrogen Oxides in an Effluent" filed in the names of Epperly, Sullivan and Sprague on Oct. 14, 1987, now U.S. Pat. No. 4,844,878; copending and commonly assigned U.S. patent application Ser. No. 207,292 entitled "Multi-Stage Process for Reducing the Concentration of Pollutants in an Effluent Using an Ammonium Salt" filed in the names of Epperly, Peter-Hoblyn, Shulof, Jr., Sullivan and Sprague on June 15, 1988, now U.S. Pat. No. 4,863,704; and copending and commonly assigned U.S. patent application Ser. No. 207,382 entitled "Process for Nitrogen Oxides Reduction With Minimization of the Production of Other Pollutants" filed in the names of Epperly, O'Leary, Sullivan and Sprague on June 15, 1988, now U.S. Pat. No. 4,902,488, the disclosures of which are incorporated herein by reference. The disclosed treatment agents include aqueous solutions of ammonia or urea, enhanced with suitable enhancers such as hexamethylenetetramine (HMTA), a paraffinic hydrocarbon, an olefinic hydrocarbon, an aromatic hydrocarbon, an oxygenated hydrocarbon (such as acetone, sugar, especially sucrose, d-galactose and molasses, an alcohol, especially ethylene glycol, methanol, furfurylalcohol, 1,3 butylene glycol, tetrahydrofuryl alcohol, 2,5-furandimethanol, a lignin derivative, especially $NH_4$-lignosulfonate and calcium lignosulfonate, a carboxylic acid, especially 2-furoic acid, gluconic acid, citric acid, formic acid, coumalic acid, 2,3,4,5-tetracarboxylic acid, furylacrylic acid, barbituric acid, oxalic acid and mucic acid, a peroxide, an aldehyde, an ether, an ester, a ketone, glycerin, tetrahydrofuran, acetone, 1,3 dioxolane, 1,4 dioxane, tetrahydrofuran, furfurylamine, n-butyl acetate, methylal, furan, fish oil, furfuryl acetate, tetrahydrofuran tetrahydrofurylamine, tetrahydropyran, mannitol, hexamethylenediamine and acetic anhydride), an ammonium salt of an organic acid having a carbon to nitrogen ratio of greater than 1:1 (such as ammonium acetate, ammonium and diammonium adipate, ammonium benzoate, ammonium binoxalate, ammonium caprylate, ammonium, diammonium and triammonium citrate, ammonium crotonate, ammonium and diammonium dodecanoate, ammonium and diammonium fumarate, ammonium heptanoate, ammonium linolenate, ammonium and diammonium malate, ammonium mono butyrate, ammonium oleate, ammonium and diammonium pthalate, ammonium propionate, ammonium salicylate, ammonium and diammonium succinate ammonium and diammonium tartarate, and ammonium, diammonium and triammonium trimellitate), a hydroxy amino hydrocarbon (such as alkanolamines, amino acids and protein-containing compositions), a heterocyclic hydrocarbon having at least one cyclic oxygen (such as furfural and derivatives of furfural), a five or six membered heterocyclic hydrocarbon having at least one cyclic nitrogen (such as piperazine, piperidine, pyridine, pyrazine, pyrazole, imidazole, oxazolidone, pyrrole, pyrrolidine), hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof, as well as aqueous solutions of the enhancers themselves.

The geometry of the boiler may also permit more than one temperature zone for introduction within the effluent temperature range of about 1350° F. to about 1750° F. For example, an introduction can be made at a location in a temperature zone where the effluent temperature is in the range of about 1550° F. to about 1750° F. A second location for introduction can be in a temperature zone where he effluent temperature is in the range of about 1350° F. to about 1550° F. The treatment agent introduced in the second of the indicated temperature zones can be similar to that of the first or can be less dilute, or comprise a different enhancer concentration, etc., as would be familiar to the skilled artisan upon reading the referenced disclosures.

Another temperature zone in a boiler at which introduction may be made is at the location where the effluent temperature is below about 1400° F. As disclosed by copending and commonly assigned U.S. patent application Ser. No. 022,799 entitled "Process for Reducing Nitrogen Oxides in an Effluent Using a Hydrocarbon or Hydrogen Peroxide", filed in the name of Sullivan on Mar. 6, 1987 and copending and commonly assigned U.S. patent application Ser. No. 155,864 entitled "Process for Nitrogen Oxides Reduction with Minimization of the Production of Other Pollutants" filed in the names of Epperly, O'Leary, Sullivan and Sprague on Feb. 2, 1988, now U.S. Pat. No. 4,877,590, the disclosures of which are incorporated herein by reference, a suitable treatment agent for introduction into the effluent at such effluent temperatures comprises a hydrocarbon, especially an oxygenated hydrocarbon such as ethylene glycol, sugar or furfural, or hydrogen peroxide. More than one temperature zone for introduction of a treatment agent can also be located within the lower effluent temperature locations in the boiler.

In a preferred embodiment, the process comprises injecting a first treatment agent into the effluent at a first temperature zone. For instance, in a large suspension-fired utility boiler, the location of introduction of the first treatment fluid can be upstream from the superheater, such that the effluent temperature in the first temperature zone is greater than about 1700° F. The composition and amount of the first treatment agent can then be chosen to provide effective reduction of $NO_x$ concentration in an effluent which is at temperatures greater than about 1700° F. while minimizing the production of ammonia. Suitable formulations for use as the first treatment agent are those comprising aqueous solutions of urea or ammonia, or gaseous ammonia.

The urea or ammonia aqueous solution functioning as the first treatment agent is preferably introduced at a number of spaced positions within the first temperature zone from nozzles or other apparatus which are effective to uniformly form and disperse droplets of the solution within the flowing effluent stream to achieve uniform mixing.

The rate of introduction of the first treatment agent into the effluent at the first temperature zone is preferably that rate which achieves maximum $NO_x$-concentration reduction up until the point of "ammonia breakthrough". "Ammonia breakthrough" is a term used in the art which refers to the point where a significant increase in the $NH_3$ concentration with rate of introduction is observed. The actual rate of introduction of the first treatment agent is determined experimentally by "tuning" the rate of introduction to achieve the conditions described above, because the actual rate will vary with effluent stream flow rate, as well as the particular temperature at that temperature zone, which can vary within the given range due to the load at which the boiler is fired. Advantageously, in the situation where the temperature range within the first temperature zone is greater than about 1700° F., and the first treatment agent is a solution comprising urea or ammonia, the molar ratio of the nitrogen in the first treatment agent to the baseline nitrogen oxides level is about 1:5 to about 5:1, more preferably about 1:3 to about 3:1, and most preferably about 1:2 to about 2:1.

The temperature of the effluent will have an influence on the concentration of urea or ammonia in the solution. At temperatures of between about 1700° F. and about 1850° F., the solution will tend to operate most effectively at concentrations of about 10 to about 50 weight percent. Contrariwise, at temperatures of greater than about 1850° F., the concentration of the solution will typically be more dilute, such as about 2 to about 10 weight percent. Alternatively, when the effluent temperature is in the range of about 1700° F. to about 1850° F., the urea or ammonia solution which comprises the first treatment agent may be enhanced by the addition of hexamethylenetetramine. Other enhancers which may be suitable for use include oxygenated hydrocarbons as described above, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof. It is also understood that the first treatment agent can comprise gaseous ammonia. In addition, depending on boiler configuration, it is anticipated that at least two temperature zones (e.g., one at a location where the effluent temperature is about 1850° F. to about 2000° F. and another at a location where the effluent temperature is about 1700° F. to about 1850° F.) may be possible and/or desired upstream from the superheater, as discussed above.

The process of this invention preferably further comprises injecting a second treatment agent into the effluent at a second treatment zone located downstream from the first temperature zone. For instance, in a large suspension-fired utility boiler, the second temperature zone can advantageously be at a location downstream from the superheater, where the temperature in the second temperature zone will typically be in the range of about 1350° F. to about 1750° F. However, as discussed above, the second temperature can be any defined zone having temperatures lower than the first temperature zone, e.g., it may be above or below the temperature of about 1350° F. to about 1750° F. so long as it is below that of the first temperature zone. The composition of the second treatment agent is then preferably chosen to achieve optimal nitrogen oxides reduction without ammonia breakthrough in this temperature zone. Advantageously, the second treatment agent for use under these conditions comprises a mixture of urea or ammonia and an enhancer, or the enhancer alone. Suitable enhancers which may be used include HMTA, a paraffinic hydrocarbon, an olefinic hydrocarbon, an aromatic hydrocarbon, an oxygenated hydrocarbon, as described above, an ammonium salt of an organic acid having a carbon to nitrogen ratio of greater than 1:1, as described above, a hydroxy amino hydrocarbon, as described above, a heterocyclic hydrocarbon having at least one cyclic oxygen, as described above, a five or six membered heterocyclic hydrocarbon having at least one cyclic nitrogen, as described above, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea and mixtures thereof, as well as aqueous solutions of the enhancers themselves. The most preferred enhancers under these conditions are ethylene glycol, ammonium acetate, pyridine, methanol, sugar and furfural.

The second treatment agent is introduced into the effluent to provide a molar ratio of nitrogen in the agent to the baseline nitrogen oxides concentration suitable to maximize the reduction of $NO_x$ concentrations in the second temperature zone while minimizing the production of other pollutants, such as ammonia or carbon monoxide. Preferably, the mixture, when composed as described above, is introduced so as to provide a molar ratio of nitrogen in the mixture to the baseline nitrogen oxides level of about 1:5 to about 5:1, more preferably about 1:3 to about 3:1 and most preferably about 1:2 to about 2:1. The enhancer is present in the agent in a weight ratio of enhancer to urea or ammonia of, preferably, about 1:10 to about 5:1, more preferably about 1:5 to about 3:1. Most preferably, the weight ratio of enhancer to urea or ammonia in the ammonia/enhancer agent is about 1:4 to about 2.5:1. In the instance where the treatment agent does not contain any nitrogen-containing compounds, the weight ratio of treatment agent to the baseline nitrogen oxides level should be about 0.5:1 to about 10:1.

Typically, the agent is prepared by dissolving a water-soluble enhancer in water at a concentration of about 5 to about 25 weight percent, more preferably about 10 to about 20 weight percent, and the desired amount of urea or ammonia mixed in. The resulting mixture is then introduced into the effluent at a number of spaced positions within the second temperature zone from nozzles or other apparatus which are effective to uniformly form and disperse droplets of the solution within the flowing effluent stream to achieve uniform mixing. As discussed above, there can be at least two temperature zones, if desired and boiler configuration permits, within the indicated effluent temperature range with at least two treatment agents introduced thereinto.

Additionally, the second treatment agent can be used to perform ammonia scrubbing, as disclosed by copending and commonly assigned U.S. patent application Ser. No. 132,801 entitled "Ammonia Scrubbing" filed in the names of Epperly, Peter-Hoblyn and Sullivan on Dec. 14, 1987, now U.S. Pat. No. 4,830,839, the disclosure of which is incorporated herein by reference. Ammonia scrubbing involves the introduction of a non-nitrogenous treatment agent such as a hydrocarbon, especially an oxygenated hydrocarbon, at an effluent temperature of greater than about 1350° F. under conditions effective to reduce the amount of ammonia in the effluent, while also achieving further nitrogen oxides reductions. Generally, the non-nitrogenous treatment agent is introduced into the effluent at a weight ratio of treatment agent to effluent ammonia level of about 2:1 to about 200:1.

A more preferred embodiment of the present invention comprises introduction of a third treatment agent into the effluent at a third temperature zone, wherein the third temperature zone is located sequentially downstream from the first and second temperature zones. For instance, in a suspension-fired utility boiler, the third temperature zone can advantageously be located after the economizer where the effluent temperature will be within the range of about 800° F. to about 1400° F. Under these conditions, the third treatment agent preferably comprises a hydrocarbon or hydrogen peroxide. The most preferred hydrocarbons suitable for use in the third treatment fluid under the indicated conditions are oxygenated hydrocarbons such as low molecular weight ketones, aldehydes, mono, di or polyhydric alcohols of aliphatic hydrocarbons and hydroxy amino hydrocarbons such as monoethanolamine and amino acetic acid (glycine). Ethylene glycol, methanol, furfural, sugar and glycerol are preferred oxygenated hydrocarbons for this purpose, with ethylene glycol, methanol and sugar being most preferred. Other hydrocarbons which can advantageously be employed include nitrogenated hydrocarbons such as monomethylamine, triethylene tetramine, hexamethylenediamine, tetraethylene pentamine, bis-hexamethylene triamine, polyamine HpA, 1,2-diaminopropane, N,N-dimethylethylenediamine, tetramethylethylenediamine, 2-methylaziridine, bis (3-aminopropyl) ethylenediamine, tetramethyldiaminomethane, ethylenediamine and diethylenetriamine. Mixtures of polyols, such as those mixtures of low molecular weight polyols known as hydrogenated starch hydrosylates, can also be advantageously employed. Additional hydrocarbons which are suitable for use in the present invention include paraffinic, olefinic and aromatic hydrocarbons, including naphtha-based hydrocarbons, and mixtures thereof.

The hydrocarbon can be used alone in its pure form, in dispersions, preferably aqueous dispersions or in solution, preferably aqueous solution due to the economy of aqueous solutions, although there may be instances where other solvents may be advantageously used, either alone or in combination with water, as would be known to the skilled artisan. The level of the hydrocarbon employed should be that level necessary to elicit optimal reductions in the concentration of nitrogen oxides in the effluent while also minimizing the presence of other pollutants, such as ammonia and carbon monoxide. Advantageously, the hydrocarbon is employed at a weight ratio of hydrocarbon to the third baseline nitrogen oxides level of about 1:5 to about 5:1, most preferably about 1:2 to about 2:1. The exact amount of hydrocarbon employed may vary depending upon the overall economics of the process.

A hydrocarbon, when utilized as the third treatment agent according to this invention, is preferably introduced into the effluent at a number of spaced positions within the third temperature zone from nozzles or other apparatus which are effective to uniformly form and disperse droplets of the hydrocarbon, either alone or in a dispersion or solution as discussed above, within the flowing effluent stream to achieve uniform mixing. Depending on boiler configuration, there can be two zones of introduction in the temperature range of about 800° F. to about 1400° F.

Advantageously, the process of the present invention can be used to reduce the concentration of sulfur trioxide in the effluent in addition to the $NO_x$ reductions and ammonia scrubbing obtained. The introduction of a treatment agent which comprises hydrogen peroxide or a hydrocarbon, especially an oxygenated hydrocarbon such as alcohols, sugars, lignin derivatives, carboxylic acids, peroxides, aldehydes, ethers, esters, ketones, and mixtures thereof, into the effluent at a temperature zone where the effluent temperature is below about 1700° F., especially no greater than about 1450° F. will significantly reduce the $SO_3$ content of the effluent. The most preferred oxygenated hydrocarbons for this purpose include methanol, ethylene glycol, molasses, glycerin, tetrahydrofuran, acetone, citric acid, sucrose, and mixtures thereof, which can be introduced as an aqueous solution at a ratio of hydrocarbon to sulfur trioxide of about 3:1 to about 8:1 by weight. The reduction of $SO_3$ in the effluent is in addition to the $NO_x$ reduction and/or ammonia scrubbing achieved with the disclosed treatment agents.

It will be recognized that the use of the terms "first", "second" and "third" herein is merely for the sake of convenient description. The actual numbering sequence will vary depending on the actual number of temperature zones chosen and the number of treatment agents introduced in each situation. This number can vary depending on boiler geometry (as discussed above) and the particular pollutant level desired.

The effluent from the combustion of a carbonaceous fuel into which the treatment agents disclosed herein according to the present invention are introduced is generally oxygen-rich, meaning that there is an excess of oxygen in the effluent. Typically, the excess of oxygen is about 15% by volume or less. In conventional utility boilers, the excess of oxygen is in usually the range of about 1% to about 10% by volume.

In practicing the process of the present invention to maximize the reduction of the concentration of nitrogen oxides in the effluent or to achieve a specified level of $NO_x$, it is preferred to first "tune" the introduction of the first treatment agent into the first temperature zone to optimize the introduction (i.e., maximize pollutant concentration reduction and minimize production of other pollutants). The introduction of the second treatment agent into the second temperature zone is then "tuned", the introduction of the third treatment agent into the third temperature zone (when a third treatment agent and third temperature zone are used) is advantageously "tuned" third, the introduction of the fourth treatment agent into the fourth temperature zone (when a fourth treatment agent and fourth temperature zone are used) is preferably "tuned" fourth, etc., until the desired number of introductions or level of pollutants is reached.

Once the introduction of treatment agents is optimized, it is also possible to "adjust" the treatment agents, by altering the dilution, relative concentration or particular components of the chemical formulation of the treatment agent, to compensate for changes in boiler operating load, which results in changes of effluent temperature at the locations at which treatment agents are introduced. Adjusting the treatment agents in response to boiler operating load changes ensures that the treatment agent introduced at each location is appropriate to maintain nitrogen oxides at specified levels or to maximize $NO_x$ reductions for the effluent temperature existing there. Otherwise, inefficient and non-optimized introduction of treatment agents may occur, resulting in lowering of pollutant reductions achieved and, potentially, the generation of substantial amounts of other pollutants.

The identity of other pollutants which comprise the limiting emissions can vary from boiler to boiler, situation to situation, or temperature zone to temperature zone. For instance, at temperature zones where the effluent temperature is relatively high, the limiting emission can be ammonia, whereas at temperature zones where the effluent temperature is relatively low, the limiting emission can be carbon monoxide. Furthermore, it may not be necessary in each case to "tune" the introduction at each temperature zone. Rather, it may be desirable to achieve maximum possible target pollutant reduction at earlier temperature zones irrespective of the production of other emissions, provided that the level of such other emissions can be reduced at later, or the last, temperature zones, especially when a process step involving ammonia scrubbing is utilized. In other words, it is the pollution index after the final introduction that is most significant, not the pollution index at intermediate levels.

Alternatively, to obtain a target level of $NO_x$ reduction while minimizing chemical cost, maximum use of the least expensive of the treatment agents without significant production of other pollutants is first established. The use of the next least expensive treatment agent is maximized next, and this process is repeated until the desired target level is reached.

Moreover, the introduction of each treatment agent may be performed in a manner so as to minimize the generation of other pollutants such as ammonia or carbon monoxide while maximizing the reduction of the target pollutant, e.g., nitrogen oxides or sulfur trioxide. This can be accomplished through use of the nitrogen oxides reduction versus effluent temperature curve as taught by copending and commonly assigned U.S. patent application Ser. No. 050,198 entitled "Process for Nitrogen Oxides Reduction and Minimization of the Production of Other Pollutants" filed in the names of Epperly, O'Leary and Sullivan on May 14, 1987, now U.S. Pat. No. 4,780,289 the disclosure of which is incorporated herein by reference.

It will be further understood that when economics, boiler load, target $NO_x$ levels or other considerations dictate, what was the second temperature zone in one situation can become the first temperature zone in another, and what was the third temperature zone in one situation can become the second temperature zone in another, etc. Moreover, the difference between any two consecutive treatment agents may be the dilution of the solutions which comprise the treatment agents.

It will also be recognized by the skilled artisan that the process of the present invention can be combined with a $NO_x$ reducing process which utilizes selective catalytic reduction ("SCR") to reduce nitrogen oxides. Such an SCR process utilizes compounds of catalytic materials such as oxides or iron, vanadium and activated carbon to reduce the $NO_x$ content of effluents. In fact, the SCR treatment can be used as an additional stage in the process of this invention. To do so, the process disclosed herein is practiced to reduce the nitrogen oxides concentration in the effluent and also to adjust the ammonia remaining in the effluent to approximately a 1:1 ratio of ammonia to the nitrogen oxides remaining in the effluent by ammonia scrubbing or other means achievable by the practice of the present invention, and then scrubbing the effluent with SCR to reduce the effluent $NO_x$ levels even further. In this way, the most advantageous aspects of both the non-catalytic, free radical reduction of nitrogen oxides disclosed herein and SCR can both be obtained, resulting in extremely high $NO_x$ reductions without significant amounts of other pollutants such as $NH_3$ or CO remaining in the effluent.

BEST MODE FOR CARRYING OUT THE INVENTION

The following examples further illustrate and explain the invention by detailing the operation of the process for reducing nitrogen oxides concentration by multistage introduction.

EXAMPLE I

The burner used in this example is a burner having an effluent flue conduit, known as a combustion tunnel, approximately 209 inches in length and having an internal diameter of 8 inches and walls 2 inches thick. The burner has a flame area adjacent the effluent entry port and flue gas monitors adjacent the effluent exit port to measure the concentration of compositions such as nitrogen oxides, sulfur oxides, ammonia, carbon monoxide, carbon dioxide, percent excess oxygen and other compounds of interest which may be present in the effluent. The effluent flue conduit additionally has thermocouple ports for temperature measurement at various locations. The temperature of the effluent into which the treatment agents are introduced is measured at the point of introduction utilizing a K-type thermocouple. Atomizing injectors described in copending and commonly assigned U.S. patent application Ser. No. 009,696 entitled "Process and Apparatus for Reducing the Concentration of Pollutants in an Effluent" filed in the name of Burton on Feb. 2, 1987, the disclosure of which is incorporated herein by reference, are positioned through ports in the effluent flue conduit in order to introduce (by injecting) and distribute the $NO_x$-reducing agents into the effluent stream. The burner fuel is a Number 2 fuel oil, and the burner is fired at a rate of 9.6 lbs/hr to 10.9 lbs/hr.

A baseline nitrogen oxides concentration reading is taken prior to beginning each run to calculate the ratio of agents introduced and to facilitate the calculation of the reduction in nitrogen oxides concentration, and a nitrogen oxides reading is taken during introduction of each of the treatment agents to calculate the reduction in the nitrogen oxides concentration in the effluent elicited by each of the agents introduced.

Seven runs were made employing the treatment agents described below. In each, a first treatment agent is introduced into the effluent at the indicated temperature. The second treatment agent is introduced into the effluent flue conduit at a position 43 inches downstream from the first treatment agent introduction point and the third treatment agent, when used, is introduced at a position 40 inches downstream from the second treatment agent introduction point.

1. An aqueous solution comprising 10% by weight of urea and 0.2% by weight of a commercially available surfactant is introduced as the first treatment agent at a rate of 100 ml/hr. into the effluent which is at a temperature of 1810° F.; and an aqueous solution comprising 5% by weight of urea, 25% by weight of ethylene glycol and 0.1% by weight of a commercially available surfactant is introduced as the second treatment agent at a rate of 200 ml/hr. into the effluent which is at a temperature of 1600° F.

2. An aqueous solution comprising 10% by weight of urea and 0.2% by weight of a commercially available surfactant is introduced as the first treatment agent at a rate of 200 ml/hr. into the effluent which is at a temperature of 1765° F.; and an aqueous solution comprising 5% by weight of urea, 25% by weight of ethylene glycol and 0.1% by weight of a commercially available surfactant is introduced as the second treatment agent at a rate of 200 ml/hr. into the effluent which is at a temperature of 1545° F.

3. An aqueous solution comprising 10% by weight of urea and 0.2% by weight of a commercially available surfactant is introduced as the first treatment agent at a rate of 100 ml/hr. into the effluent which is at a temperature of 1760° F.; and an aqueous solution comprising 10% by weight of urea, 30% by weight of sucrose and 0.2% by weight of a commercially available surfactant is introduced as the second treatment agent at a rate of 200 ml/hr. into the effluent which is at a temperature of 1540° F.

4. An aqueous solution comprising 10% by weight of urea and 0.2% by weight of a commercially available surfactant is introduced as the first treatment agent at a rate of 200 ml/hr. into the effluent which is at a temperature of 1765° F.; and an aqueous solution comprising 7.28% by weight of urea, 3.12% by weight of hexamethylenetetraamine, 15% by weight of ethylene glycol and 0.208% by weight of a commercially available surfactant is introduced as the second treatment agent at a rate of 200 ml/hr. into the effluent at a temperature of 1545° F.

5. An aqueous solution comprising 10% by weight of urea and 0.2% by weight of a commercially available surfactant is introduced as the first treatment agent at a rate of 200 ml/hr. into the effluent which is at a temperature of 1790° F.; an aqueous solution comprising 10% by weight of urea, 30% by weight of sucrose and 0.2% by weight of a commercially available surfactant is introduced as the second treatment agent at a rate of 100 ml/hr. into the effluent at a temperature of 1560° F.; and an aqueous solution comprising 15% by weight of sucrose is introduced as the third treatment agent at a rate of 100 ml/hr. into the effluent at a temperature of 1305° F.

6. An aqueous solution comprising 10% by weight of urea and 0.2% by weight of a commercially available surfactant is introduced as the first treatment agent at a rate of 200 ml/hr. into the effluent which is at a temperature of 1790° F.; an aqueous solution comprising 10% by weight of urea, 30% by weight of sucrose and 0.2% by weight of a commercially available surfactant is introduced as the second treatment agent at a rate of 100 ml/hr. into the effluent at a temperature of 1560° F.; and an aqueous solution comprising 15% by weight of glycerol is introduced as the third treatment agent at a rate of 100 ml/hr. into the effluent which is at a temperature of 1305° F.

7. An aqueous solution comprising 10% by weight of urea and 0.2% by weight of a commercially available surfactant is introduced as the first treatment agent at a rate of 200 ml/hr. into the effluent which is at a temperature of 1750° F.; an aqueous solution comprising 10% by weight of urea, 30% by weight of sucrose and 0.2% by weight of a commercially available surfactant is introduced as the second treatment agent at a rate of 100 ml/hr. into the effluent at a temperature of 1530° F.; and kerosene is introduced as the third treatment agent at a rate of 100 ml/hr. into the effluent which is at a temperature of 1295° F.

The results of the above-described runs are set out in Table 1.

TABLE 1

| Run | $NO_x$ Baseline ppm | $NO_x$ Final ppm | % reduction | $NH_3$ ppm |
| --- | --- | --- | --- | --- |
| 1 | 240 | 120 | 50.0 | 4 |
| 2 | 218 | 75 | 65.6 | 21 |
| 3 | 220 | 92 | 58.2 | 19 |
| 4 | 218 | 83 | 61.9 | 30 |
| 5 | 210 | 42 | 80.0 | 21 |
| 6 | 210 | 39 | 81.4 | — |
| 7 | 210 | 50 | 76.2 | — |

EXAMPLE II

The boiler used is a front fired coal design with a nominal 140 megawatt (thermal) per hour input. The temperature of the effluent which is measured at the first level of introduction is approximately 1900° F. with an excess of oxygen of about 4.5% and the temperature of the effluent at the second level of introduction is approximately 1750° F. with an excess of oxygen of about 8.2%.

An aqueous solution comprising 8.6% by weight of urea and 0.17% by weight of a commercially available surfactant is introduced as the first treatment agent at a rate of 754 gallons/hr. to provide a normalized stoichiometric ratio (NSR) of treatment agent to baseline nitrogen oxides level of 1.79 and an aqueous solution comprising 16.5% by weight of urea and 0.33% by weight of a commercially available surfactant is introduced as the second treatment agent at a rate of 91 gallons/hr. to provide an NSR of treatment agent to baseline nitrogen oxides level of 0.41.

The baseline $NO_x$ level is measured at 693 ppm and the $NO_x$ level measured during introduction of the first treatment agent, measured upstream from introduction of the second treatment agent, is approximately 251 ppm. The $NO_x$ level measured during introduction of the first and second treatment agents is 145 ppm, which is an 79.1% reduction from the original baseline $NO_x$ level (all $NO_x$ levels are corrected so as to be standardized to 3% oxygen).

It will be apparent that by practice of the present invention, superior $NO_x$ reductions can be elicited without significant ammonia breakthrough.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for reducing the concentration of nitrogen oxides, sulfur trioxide or both in the effluent from the combustion of a carbonaceous fuel, the process comprising:

a. introducing a first treatment agent selected from the group consisting of gaseous ammonia, and an aqueous solution of urea or ammonia and mixtures thereof into the effluent at a first temperature zone in order to reduce the concentration of nitrogen oxides in the effluent; and b. introducing a second treatment agent selected from the group consisting of urea, ammonia, hexamethylenetetraamine, an oxygenated hydrocarbon, a paraffinic hydrocarbon, an olefinic hydrocarbon, an aromatic hydrocarbon, an ammonium salt of an organic acid having a carbon to nitrogen ratio of greater than 1:1, a hydroxy amino hydrocarbon, a heterocyclic hydrocarbon having at least one cyclic oxygen, a five- or six-membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof into the effluent at a second temperature zone in order to reduce the concentration of nitrogen oxides, sulfur trioxide, or both in the effluent, wherein said first and second treatment agents are introduced under conditions effective to lower the effluent pollution index.

2. The process of claim 1 wherein the effluent temperature at said first temperature zone is about 1700° F. to about 2100° F.

3. The process of claim 1 wherein the effluent temperature at said first temperature zone is about 1850° F. to about 2100° F. and the effluent temperature at said second temperature zone is about 1700° F. to about 1850° F.

4. The process of claim 3 wherein said first treatment agent comprises an aqueous solution comprising about 2% to about 10% of urea or ammonia and said second treatment agent comprises an aqueous solution comprising about 10% to about 50% of urea or ammonia.

5. The process of claim 3 wherein said first treatment agent comprises gaseous ammonia or an aqueous solution of urea or ammonia and said second treatment agent comprises an aqueous solution of urea or ammonia, wherein said second treatment agent further comprises a composition selected from the group consisting of hexamethylenetetramine and an oxygenated hydrocarbon.

6. The process of claim 3 which further comprises introducing a third treatment agent into the effluent at a third temperature zone.

7. The process of claim 6 wherein the effluent temperature at said third temperature zone is about 1350° F. to about 1750° F.

8. The process of claim 6 wherein the effluent temperature at said third temperature zone is below about 1400° F.

9. The process of claim 1 wherein the effluent temperature at said second temperature zone is about 1350° F. to about 1750° F.

10. The process of claim 1 wherein said oxygenated hydrocarbon is selected from the group consisting of acetone, sugar, an alcohol, a lignin derivative, a carboxylic acid, a peroxide, an aldehyde, an ether, an ester, a ketone, glycerin, tetrahydrofuran, acetone, $NH_4$-lignosulfonate, calcium lignosulfonate, 1,3 dioxolane, 1,4 dioxane, tetrahydrofuran, furfurylamine, n-butyl acetate, methylal, furan, fish oil, furfuryl acetate, tetrahydrofuran tetrahydrofurylamine, tetrahydropyran, mannitol, hexamethylenediamine and acetic anhydride.

11. The process of claim 10 wherein said sugar is selected from the group consisting of sucrose, d-galactose and molasses.

12. The process of claim 10 wherein said alcohol is selected from the group consisting of ethylene glycol, methanol, furfurylalcohol, 1,3 butylene glycol, tetrahydrofuryl alcohol, 2,5-furandimethanol.

13. The process of claim 10 wherein said carboxylic acid is selected from the group consisting of 2-furoic acid, gluconic acid, citric acid, formic acid, coumalic acid, 2,3,4,5-tetracarboxylic acid, furylacrylic acid, barbituric acid, oxalic acid and mucic acid.

14. The process of claim 1 wherein said ammonium salt of an organic acid having a carbon to nitrogen ratio of greater than 1:1 is selected from the group consisting of ammonium acetate, ammonium and diammonium adipate, ammonium benzoate, ammonium binoxalate, ammonium caprylate, ammonium, diammonium and triammonium citrate, ammonium crotonate, ammonium and diammonium dodecanoate, ammonium and diammonium fumarate, ammonium heptanoate, ammonium linolenate, ammonium and diammonium malate, ammonium mono butyrate, ammonium oleate, ammonium and diammonium pthalate, ammonium propionate, ammonium salicylate, ammonium and diammonium succinate ammonium and diammonium tartarate, and ammonium, diammonium and triammonium trimellitate.

15. The process of claim 1 wherein said heterocyclic hydrocarbon having at least one cyclic oxygen is selected from the group consisting of furfural and derivatives of furfural.

16. The process of claim 1 wherein said hydroxy amino hydrocarbon is selected from the group consisting of alkanolamines, amino acids and protein-containing compositions.

17. The process of claim 1 wherein said five or six membered heterocyclic hydrocarbon having at least one cyclic nitrogen is selected from the group consisting of piperazine, piperidine, pyridine, pyrazine, pyrazole, imidazole, oxazolidone, pyrrole, pyrrolidine, and mixtures thereof.

18. The process of claim 1 which further comprises introducing a third treatment agent into the effluent at a third temperature zone.

19. The process of claim 18 wherein the effluent temperature at said third temperature zone is below about 1400° F.

20. The process of claim 19 wherein said third treatment agent comprises a composition selected from the group consisting of hydrogen peroxide and paraffinic, olefinic, aromatic, oxygenated and nitrogenated hydrocarbons.

21. The process of claim 20 wherein said third treatment agent comprises an oxygenated hydrocarbon.

22. The process of claim 20 wherein said nitrogenated hydrocarbon is selected from the group consisting of monomethylamine, triethylene tetramine, hexamethylenediamine, tetraethylene pentamine, bis-hexamethylene triamine, polyamine HpA, 1,2-diaminopropane, N,N-dimethylethylenediamine, tetramethylethylenediamine, 2-methylaziridine, bis (3-aminopropyl) ethylenediamine, tetramethyldiaminomethane, ethylenediamine and diethylenetriamine.

23. The process of claim 1 wherein the effluent temperature at said first temperature zone is about 1700° F.

to about 2000° F. and the effluent temperature at said second temperature zone is about 1350° F. to about 1750° F.

24. The process of claim 1 wherein the effluent temperature at said second temperature zone is below about 1450° F.

25. The process of claim 1 wherein the effluent temperature at said first temperature zone is about 1350° F. to about 1750° F. and the effluent temperature at said second temperature zone is below about 1400° F.

26. The process of claim 4 which further comprises introducing a third treatment agent into the effluent at a third temperature zone.

27. The process of claim 5 which further comprises introducing a third treatment agent into the effluent at a third temperature zone.

28. The process of claim 27 wherein the effluent temperature at said third temperature zone is about 1350° F. to about 1750° F. and said third treatment agent comprises urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five or six membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1′-azobisformamide, methylol urea, methylol urea-urea condensation product, dimethylol urea, methyl urea, dimethyl urea and mixtures thereof.

29. The process of claim 28 wherein said oxygenated hydrocarbon is selected from the group consisting of sugar, an alcohol, a lignin derivative, a carboxylic acid, a peroxide, an aldehyde, an ether, an ester, a ketone, glycerin, tetrahydrofuran, acetone, $NH_4$-lignosulfonate, calcium lignosulfonate, 1,3 dioxolane, 1,4 dioxane, tetrahydrofuran, furfurylamine, n-butyl acetate, methylal, furan, fish oil, furfuryl acetate, tetrahydrofuran tetrahydrofurylamine, tetrahydropyran, mannitol, hexamethylenediamine and acetic anhydride.

30. The process of claim 29 wherein said sugar is selected from the group consisting of sucrose, d-galactose and molasses.

31. The process of claim 29 wherein said alcohol is selected from the group consisting of ethylene glycol, methanol, furfurylalcohol, 1,3 butylene glycol, tetrahydrofuryl alcohol, 2,5-furandimethanol.

32. The process of claim 29 wherein said carboxylic acid is selected from the group consisting of 2-furoic acid, gluconic acid, citric acid, formic acid, coumalic acid, 2,3,4,5-tetracarboxylic acid, furylacrylic acid, barbituric acid, oxalic acid and mucic acid.

33. The process of claim 28 wherein said ammonium salt of an organic acid having a carbon to nitrogen ratio of greater than 1:1 is selected from the group consisting of ammonium acetate, ammonium and diammonium adipate, ammonium benzoate, ammonium binoxalate, ammonium caprylate, ammonium, diammonium and triammonium citrate, ammonium crotonate, ammonium and diammonium dodecanoate, ammonium and diammonium fumarate, ammonium heptanoate, ammonium linolenate, ammonium and diammonium malate, ammonium mono butyrate, ammonium oleate, ammonium and diammonium pthalate, ammonium propionate, ammonium salicylate, ammonium and diammonium succinate ammonium and diammonium tartarate, and ammonium, diammonium and triammonium trimellitate.

34. The process of claim 28 wherein said heterocyclic hydrocarbon having at least one cyclic oxygen is selected from the group consisting of furfural and derivatives of furfural.

35. The process of claim 28 wherein said hydroxy amino hydrocarbon is selected from the group consisting of alkanolamines, amino acids and protein-containing compositions.

36. The process of claim 28 wherein said five or six membered heterocyclic hydrocarbon having at least one cyclic nitrogen is selected from the group consisting of piperazine, piperidine, pyridine, pyrazine, pyrazole, imidazole, oxazolidone, pyrrole, pyrrolidine, and mixtures thereof.

37. The process of claim 27 wherein the effluent temperature at said third temperature zone is below about 1400° F. and said third treatment agent comprises a composition selected from the group consisting of hydrogen peroxide and paraffinic, olefinic, aromatic, oxygenated and nitrogenated hydrocarbons.

38. The process of claim 18 which comprises introducing a fourth treatment agent into the effluent at a fourth temperature zone.

39. The process of claim 1 wherein each of said treatment agents is introduced so as to minimize the generation of pollutants other than nitrogen oxides while substantially maximizing the reduction in nitrogen oxides concentration by utilizing the nitrogen oxides reduction versus effluent temperature curve for each treatment agent.

40. A process for the reduction of the concentration of nitrogen oxides in the effluent from the combustion of a carbonaceous fuel, the process comprising selecting a plurality of locations for introduction of chemical formulations and introducing at each of said locations at least one chemical formulation, selected from the group consisting of urea, ammonia, hexamethylenetetraamine, an oxygenated hydrocarbon, a paraffinic hydrocarbon, an olefinic hydrocarbon, an aromatic hydrocarbon, an ammonium salt of an organic acid having a carbon to nitrogen ratio of greater than 1:1, a hydroxy amino hydrocarbon, a heterocyclic hydrocarbon having at least one cyclic oxygen, a five- or six-membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, methyl urea, and mixtures thereof, effective to reduce the concentration of nitrogen oxides at the effluent temperature existing at said location, such that optimization of the level of injection at each of said locations leads to the reduction of the level of nitrogen oxides below a predetermined target level.

41. The process of claim 40 wherein each of said formulations is adjusted in response to changes in boiler load in order to substantially maintain the nitrogen oxides reductions achieved.

42. The process of claim 40 wherein each of said formulations is adjusted in response to changes in boiler load in order to maintain the nitrogen oxides level in the effluent at a specified level.

43. A process for the reduction of the concentration of nitrogen oxides in the effluent from the combustion of a carbonaceous fuel to a predetermined target level at minimum cost, the process comprising selecting a plurality of locations for introduction into the effluent; selecting at least one chemical formulation selected from the group consisting of urea, ammonia, hexamethyl- enetetraamine, an oxygenated hydrocarbon, a paraffinic hydrocarbon, an olefinic hydrocarbon, an aromatic hydrocarbon, an ammonium salt of an organic acid having a carbon to nitrogen ratio of greater than 1.1, a hydroxy amino hydrocarbon, a heterocyclic hydrocarbon having at least one cyclic oxygen, a five- or six-membered hetero- cyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof, for introduction onto each of said locations, each of said chemical formulations being effective at the reduction of the concentration of nitrogen oxides at the effluent temperature existing at the location into which said chemical formulation is introduced; and introducing said chemical formulations into the effluent, wherein the sequence of introduction comprises introducing the least expensive formulation first, and repeating the introduction procedure with the remaining chemical formulations until the predetermined target level is attained.

44. A process for reducing the concentration of nitrogen oxides, and sulfur trioxide or ammonia in the effluent from the combustion of a carbonaceous fuel, the process comprising:
  a. introducing a first treatment agent selected from the group consisting of urea, ammonia, hexamethylenetetraamine, an oxygenated hydrocarbon, a paraffinic hydrocarbon, an olefinic hydrocarbon, an aromatic hydrocarbon, an ammonium slat of an organic acid having a carbon to nitrogen ratio of greater than 1:1, a hydroxy amino hydrocarbon, a heterocyclic hydrocarbon having at least one cyclic oxygen, a five- or sic-membered heterocyclic hydrocarbon having at least one cyclic nitrogen, hydrocarbon peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof, into the effluent at a first temperature zone to reduce the concentration of nitrogen oxides; and
  b. introducing a second treatment agent comprising an oxygenated hydrocarbon into the effluent at a second temperature zone to reduce the concentration of sulfur trioxide or ammonia, wherein said first and second treatment agents are introduced under conditions effective to lower the effluent pollution index.

45. The process of claim 44 wherein the effluent temperature at said first temperature zone is about 1700° F. to about 2000° F. and said first treatment agent comprises gaseous ammonia or an aqueous solution of urea or ammonia.

46. The process of claim 44 wherein the effluent temperature at said first temperature zone is about 1350° F. to about 1750° F.

47. The process of claim 46 wherein said oxygenated hydrocarbon is selected from the group consisting of sugar, acetone, an alcohol, a lignin derivative, a carboxylic acid, a peroxide, an aldehyde, an ether, an ester, a ketone, glycerin, tetrahydrofuran, acetone, NH4-lignosulfonate, calcium lignosulfonate, 1,3 dioxolane, 1,4 dioxane, tetrahydrofuran, furfurylamine, n-butyl acetate, methylal, furan, fish oil, furfuryl acetate, tetrahydrofuran tetrahydrofurylamine, tetrahydropyran, mannitol, hexamethylenediamine and acetic anhydride.

48. The process of claim 47 wherein said sugar is selected from the group consisting of sucrose, d-galactose and molasses.

49. The process of claim 47 wherein said alcohol is selected from the group consisting of ethylene glycol, methanol, furfurylalcohol, 1,3 butylene glycol, tetrahydrofuryl alcohol, 2,5-furandimethanol.

50. The process of claim 47 wherein said carboxylic acid is selected from the group consisting of 2-furoic acid, gluconic acid, citric acid, formic acid, coumalic acid, 2,3,4,5-tetracarboxylic acid, furylacrylic acid, barbituric acid, oxalic acid and mucic acid.

51. The process of claim 46 wherein said ammonium salt of an organic acid having a carbon to nitrogen ratio of greater than 1:1 is selected from the group consisting of ammonium acetate, ammonium and diammonium adipate, ammonium benzoate, ammonium binoxalate, ammonium caprylate, ammonium, diammonium and triammonium citrate, ammonium crotonate, ammonium and diammonium dodecanoate, ammonium and diammonium fumarate, ammonium heptanoate, ammonium linolenate, ammonium and diammonium malate, ammonium mono butyrate, ammonium oleate, ammonium and diammonium pthalate, ammonium propionate, ammonium salicylate, ammonium and diammonium succinate ammonium and diammonium tartarate, and ammonium, diammonium and triammonium trimellitate.

52. The process of claim 46 wherein said heterocyclic hydrocarbon having at least one cyclic oxygen is selected from the group consisting of furfural and derivatives of furfural.

53. The process of claim 46 wherein said hydroxy amino hydrocarbon is selected from the group consisting of alkanolamines, amino acids and protein-containing compositions.

54. The process of claim 46 wherein said five or six membered heterocyclic hydrocarbon having at least one cyclic nitrogen is selected from the group consisting of piperazine, piperidine, pyridine, pyrazine, pyrazole, imidazole, oxazolidone, pyrrole, pyrrolidine, and mixtures thereof.

55. The process of claim 45 wherein the effluent temperature at said second temperature zone is no greater than about 1700° F. and said second treatment agent comprises an oxygenated hydrocarbon.

56. The process of claim 55 wherein said oxygenated hydrocarbon is selected from the group consisting of alcohols, sugars, lignin derivatives, carboxylic acids, peroxides, aldehydes, ethers, esters, ketones, and mixtures thereof.

57. The process of claim 56 wherein said oxygenated hydrocarbon is selected from the group consisting of methanol, ethylene glycol, molasses, glycerin, tetrahydrofuran, acetone, ammonium acetate, citric acid, sucrose, and mixtures thereof.

58. The process of claim 45 wherein the effluent temperature at said second temperature zone is no greater than about 1450° F.

59. The method of claim 45 wherein the weight ratio of said second treatment agent to sulfur trioxide in the effluent is about 3:1 to about 8:1.

60. The method of claim 45 wherein said second treatment agent comprises an aqueous dispersion.

61. The process of claim 44 which comprises introducing a third treatment agent into the effluent at a third temperature zone to reduce the concentration of a third pollutant in the effluent.

62. The process of claim 61 wherein said first pollutant comprises nitrogen oxides, said second pollutant comprises ammonia and said third pollutant comprises sulfur trioxide.

63. The process of claim 62 wherein said second treatment agent is effective at performing ammonia scrubbing.

64. The process of claim 63 wherein the effluent temperature at said second temperature zone is greater than about 1350° F.

65. The process of claim 64 wherein said second treatment agent comprises a non-nitrogenous treatment agent.

66. The process of claim 61 wherein the effluent temperature at said third temperature zone is no greater than about 1450° F. and said third treatment agent comprises hydrogen peroxide or an oxygenated hydrocarbon.

67. The process of claim 66 wherein said oxygenated hydrocarbon is selected from the group consisting of alcohols, sugars, lignin derivatives, carboxylic acids, peroxides, aldehydes, ethers, esters, ketones, and mixtures thereof.

68. The process of claim 67 wherein said oxygenated hydrocarbon is selected from the group consisting of methanol, ethylene glycol, molasses, glycerin, tetrahydrofuran, acetone, ammonium acetate, citric acid, sucrose, and mixtures thereof.

69. A process for reducing the concentration of nitrogen oxides in the effluent from the combustion of a carbonaceous fuel, the process comprising:
  a. introducing into the effluent a treatment agent which comprises any of urea, ammonia, hexamethylenetetramine, a paraffinic hydrocarbon, an olefinic hydrocarbon, an aromatic hydrocarbon, an oxygenated hydrocarbon, an ammonium salt of an organic acid having a carbon to nitrogen ratio of greater than 1:1, a hydroxy amino hydrocarbon, a heterocyclic hydrocarbon having at least one cyclic oxygen, a five- or six-membered heterocyclic hydrocarbon having at least one cyclic nitrogen, hydrogen peroxide, guanidine, guanidine carbonate, biguanidine, guanylurea sulfate, melamine, dicyandiamide, calcium cyanamide, biuret, 1,1'-azobisformamide, methylol urea, methylol urea-urea condensation product, dimethylol urea, methyl urea, dimethyl urea, and mixtures thereof under conditions effective to effect a free radical nitrogen oxides reducing process; and
  b. contacting the effluent with a compound of catalytic material under conditions effective to effect a selective catalytic nitrogen oxides reducing process, wherein said nitrogen oxides reducing processes are effected under conditions effective to lower the effluent pollution index.

70. The process of claim 69 wherein said free radical nitrogen oxides reducing process comprises:
  a. introducing a first nitrogen oxides reducing treatment agent into the effluent at a first temperature zone; and
  b. introducing a second nitrogen oxides reducing treatment agent into the effluent at a second temperature zone, wherein said first and second nitrogen oxides reducing treatment agents are introduced under conditions effective to lower the effluent pollution index.

\* \* \* \* \*

UNITED STATES PATENT AND TRADEMARK OFFICE
CERTIFICATE OF CORRECTION

PATENT NO. : 5,057,293

DATED : October 15, 1991

INVENTOR(S) : William R. Epperly, et. al.

It is certified that error appears in the above-identified patent and that said Letters Patent is hereby corrected as shown below:

Column 22, line 13, "sic-membered" should read --six-membered--.

Signed and Sealed this

Twenty-third Day of February, 1993

*Attest:*

STEPHEN G. KUNIN

*Attesting Officer*     *Acting Commissioner of Patents and Trademarks*